United States Patent
Webster

(10) Patent No.: US 10,467,321 B2
(45) Date of Patent: Nov. 5, 2019

(54) SYSTEMS AND METHODS FOR DYNAMIC C# SERIALIZATION

(71) Applicant: MASTERCARD INTERNATIONAL INCORPORATED, Purchase, NY (US)

(72) Inventor: Mark Webster, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 250 days.

(21) Appl. No.: 15/698,231

(22) Filed: Sep. 7, 2017

(65) Prior Publication Data
US 2019/0073430 A1 Mar. 7, 2019

(51) Int. Cl.
| | | |
|---|---|---|
| *G06F 16/44* | (2019.01) | |
| *G06F 16/958* | (2019.01) | |
| *G06F 9/448* | (2018.01) | |
| *G06F 16/951* | (2019.01) | |
| *G06F 8/30* | (2018.01) | |
| *G06F 16/25* | (2019.01) | |

(52) U.S. Cl.
CPC ............ *G06F 16/986* (2019.01); *G06F 8/315* (2013.01); *G06F 9/4488* (2018.02); *G06F 9/4493* (2018.02); *G06F 16/25* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 6,298,353 B1 | 10/2001 | Apte | |
| 6,477,701 B1 | 11/2002 | Heistermann et al. | |
| 8,806,506 B2 | 8/2014 | Malladi et al. | |
| 8,930,888 B2 | 1/2015 | Canches | |
| 9,019,286 B2 | 4/2015 | Becker | |
| 9,195,527 B2 * | 11/2015 | Malladi | G06F 9/541 |
| 9,460,198 B1 | 10/2016 | Aman | |
| 9,462,085 B2 | 10/2016 | Bullotta et al. | |
| 2004/0039964 A1 * | 2/2004 | Russell | G06F 9/4493 714/25 |
| 2006/0218538 A1 | 9/2006 | Van Kesteren | |

(Continued)

OTHER PUBLICATIONS

PCT International Search Report and Written Opinion, Application No. PCT/US2018/044493 dated Oct. 26, 2018, 13 pps.

(Continued)

*Primary Examiner* — Craig C Dorais
(74) *Attorney, Agent, or Firm* — Armstrong Teasdale LLP

(57) ABSTRACT

C Sharp (C#) system including one or more C Sharp (C#) computing devices for dynamically serializing C Sharp (C#) during runtime is provided. The C# system is configured to receive a serialized JSON class including at least one data object associated with at least one attribute name and deserialize the serialized JSON class. The C# system is also configured to serialize a C# class using the deserialized JSON class, and dynamically identify, from the C# class, the at least one data object during the runtime of the data objects. The C# system is further configured to generate a dynamic C# class, wherein the dynamic C# class includes a target class and a method for returning the at least one data object, and return the at least one data object.

18 Claims, 5 Drawing Sheets

(56) References Cited

U.S. PATENT DOCUMENTS

| | | |
|---|---|---|
| 2010/0325227 A1 | 12/2010 | Novy |
| 2012/0246551 A1* | 9/2012 | Patton .................. G06F 9/4493 715/227 |
| 2013/0117326 A1 | 5/2013 | De Smet et al. |
| 2014/0282392 A1 | 9/2014 | Shukla et al. |
| 2015/0186116 A1* | 7/2015 | Tozawa ............. G06F 16/24528 707/773 |
| 2017/0085646 A1 | 3/2017 | Zhou et al. |

OTHER PUBLICATIONS

Kanivalan Raju: "Deserializing JSON to Object Without Creating Custom Class", Jun. 9, 2016, XP055515282, Retrieved from the Internet: URL:https://www.codeproject.com/Tips/1105691/Deserializing-JSON-to-Object-Without-Creating-Cust?display=Print, [retrieved on Oct. 15, 2018], 2 pages.

Alex Ghiondea: "Using Anonymous types to deserialize JSON data", Dec. 22, 2008, XP055515198, Retrieved from the Internet: URL:https://blogs.msdn.microsoft.com/alexghi/2008/12/22/using-anonymous-types-to-deserialize-ison-data/, [retrieved on Oct. 15, 2018], 5 pages.

\* cited by examiner

SYSTEMS AND METHODS FOR DYNAMIC C# SERIALIZATION

BACKGROUND

This disclosure relates generally to systems and methods for dynamically serializing a data format used to return data objects, more particularly, to network-based systems and methods for dynamically serializing C Sharp (C#) data format during runtime of the data objects.

To communicate and transfer data between computing devices, computer systems use various protocols and message formats. JavaScript Object Notation, otherwise known as JSON, is an open standard data format that is computer language independent but uses conventions that are familiar to programmers of the C-family of languages, including C, C++, C#, Java, JavaScript, Perl, Python, or the like. The JSON computer language defines a set of rules for encoding documents in a format which is both human-readable and writeable and machine-readable and writeable. JSON data may be transmitted between computers using any type of data transmission media. JSON data may be processed using computer programs and other suitably configured applications.

Some known systems use Representational State Transfer (REST) servers to build web services that are light weight, maintainable, and scalable. These web services are also known as RESTful services. When complex JSON data (e.g., JSON strings) has to be transmitted between RESTful services, the JSON data is wrapped into a JSON class. However, in order to deserialize a JSON class to a C# class, a C# class has to pre-exist for a type of data object that it is desired to be deserialized. Because the attribute name of each type of data object is different depending on the web method that returns the attribute name, multiple definitions of the same C# class are required for deserializing the same data object type from different web methods. The creation of multiple definitions of the same C# class make maintenance and updates of C# classes extremely computationally intensive and time consuming.

BRIEF DESCRIPTION

In one aspect, C Sharp (C#) system including one or more C Sharp (C#) computing devices for dynamically serializing C Sharp (C#) during runtime is provided. The one or more C# computing devices include a processor communicatively coupled to a memory. The C# system is configured to receive a serialized JSON class including at least one data object associated with at least one attribute name and deserialize the serialized JSON class. The C# system is also configured to serialize a C# class using the deserialized JSON class, and dynamically identify, from the C# class, the at least one data object during the runtime of the data objects. The C# system is further configured to generate a dynamic C# class, wherein the dynamic C# class includes a target class and a method for returning the at least one data object, and return the at least one data object.

In another aspect, a computer-implemented method for dynamically serializing C Sharp (C#) classes during runtime of data objects is provided. The method is performed using one or more C Sharp (C#) computing devices that include at least one processor in communication with at least one memory device. The method includes receiving a serialized JSON class including at least one data object associated with at least one attribute name and deserializing the serialized JSON class. The method also includes serializing a C# class using the deserialized JSON class, and dynamically identifying, from the C# class, the at least one data object during the runtime of the data objects. The method further includes generating a dynamic C# class, wherein the dynamic C# class includes a target class and a method for returning the at least one data object, and returning the at least one data object.

In yet another aspect, a non-transitory computer readable medium that includes executable instructions for dynamically serializing C Sharp (C#) classes during runtime of data objects is provided. When the computer executable instructions are executed by one or more C Sharp (C#) computing devices that include at least one processor in communication with at least one memory device, the computer executable instructions cause the one or more C# computing devices to receive a serialized JSON class including at least one data object associated with at least one attribute name and deserialize the serialized JSON class. The computer executable instructions also cause the one or more C# computing devices to serialize a C# class using the deserialized JSON class, and dynamically identify, from the C# class, the at least one data object during the runtime of the data objects. The computer executable instructions further cause the one or more C# computing devices to generate a dynamic C# class, wherein the dynamic C# class includes a target class and a method for returning the at least one data object, and return the at least one data object.

BRIEF DESCRIPTION OF THE DRAWINGS

FIG. 1 is a simplified block diagram of an example a C Sharp (C#) system for dynamically serializing C Sharp (C#) classes during runtime of data objects.

FIG. 2 illustrates an example process flow for dynamically serializing C# classes during runtime of data objects.

FIG. 3 illustrates an example configuration of a server system, such as the server system shown in FIG. 1.

FIG. 4 is an example flow diagram illustrating a method flow for dynamically serializing C# classes during runtime of data objects.

FIG. 5 shows an example configuration of a database within a computing device, along with other related computing components, that may be used to dynamically serialize C# classes during runtime of data objects.

Like numbers in the Figures indicate the same or functionally similar components.

DETAILED DESCRIPTION

Figure 1:
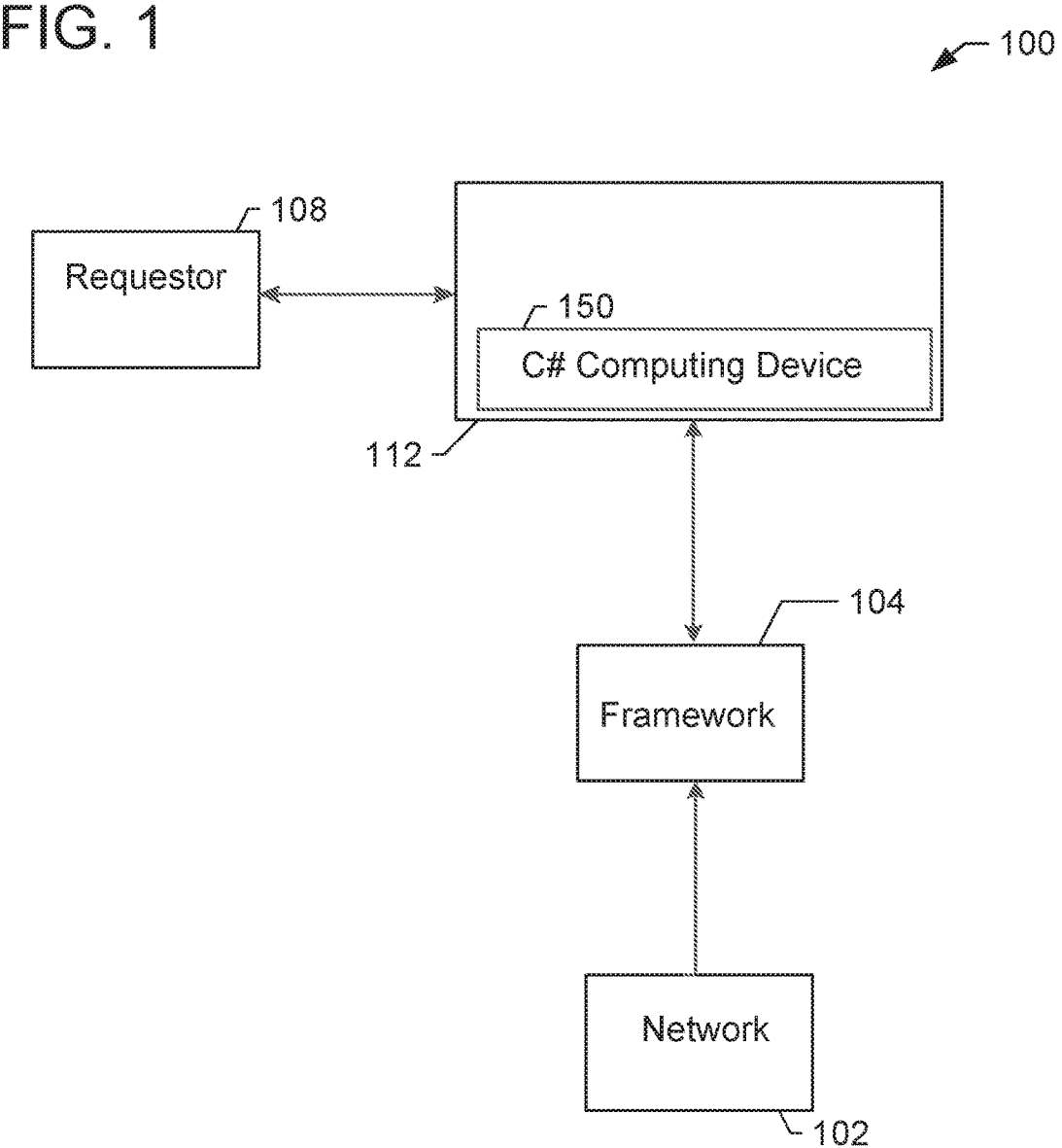
FIGS. 1-5 show example embodiments of the methods and systems described herein.

The systems and methods described herein relate generally to dynamically deserializing a particular data format used to return data objects. More specifically, the systems and methods described herein are configured to dynamically serialize a C Sharp (C#) class during runtime using a C# system including one or more C# computing devices.

An overview of example embodiments is provided herein. In one example embodiment, the C# system includes at least a framework that receives JavaScript Object Notation (JSON) strings from web services via a network. The C# system also includes a JSON serializer component (e.g., a framework) for serializing one or more JSON strings to one or more JSON classes and a communication component for transmitting the one or more JSON classes to a JSON deserializer component. In some embodiments, the transmission of the one or more JSON classes may be performed via a network. In other embodiments, the transmission of the one or more JSON classes may be performed without the use of the network. The C# system further includes a C# serializer for serializing the one or more deserialized JSON class to one or more C# classes. The C# serializer component also requests the one or more C# classes to return an instance variable (e.g., data object desired to be returned) associated with an attribute name included in the one or more C# classes. Once the instance variable is returned, the C# serializer creates a dynamic C# class for the instance variable. The dynamic C# class is based on data corresponding to the instance variable and not the attribute name. Therefore, the data object that the dynamic C# class returns only includes the object and the data desired to be returned (e.g., "object.name"). The attribute name is removed from the data object simplifying the syntax of the returned data object.

In the example embodiment, the C# system includes at least one C# computing device configured to receive the JSON strings through a frontend interface, such as a web interface or a command line tool, which is coupled to at least one client computing device. The C# computing device is also configured to serialize the JSON strings to at least one JSON class. The JSON class includes at least one attribute name desired to be returned. The C# computing device is further configured to deserialize the JSON class and serialize the deserialized JSON class to a C# class. Once the C# computing device has serialized the C# class, the C# computing device identifies an attribute name included in the C# class that is desired to be returned. The attribute name included in the C# class is the same as the attribute included in the JSON class. The C# computing device is further configured to generate a dynamic C# class for a specific associated with the identified attribute name. The dynamic C# class includes a target class and a method of returning the embedded values within the dynamic C# class in the type desired. The C# computing device generates the dynamic C# class by performing the following steps: determine the name of the deserialized JSON class by interrogating the C# class and identifying the attribute name included in the C# class; create the dynamic C# class (this is the shell of the data object the C# computing device will return); add desired references to be returned to the dynamic C# class; create a new method within the dynamic C# class to return the deserialized value (the data object that the C# will return); compile the dynamic C# class; create an active instance of the dynamic C# class in memory; return the dynamic C# class.

In the example embodiment, the C# computing device is configured to use at least one C# class to dynamically generate dynamic C# classes at runtime to consume wrapped JSON Web Service (JSON-WS) responses without requiring defining a C# wrapper class in advance. In some embodiments, the C# computing device may receive and deserialize multiple JSON classes from different web service calls. To avoid manually generating a distinct C# class for each JSON class received from different web service calls, the C# computing device generates at least one dynamic C# class (e.g., a wrapper class) at runtime from the at least one C# class and transmits the dynamic C# class to an application requesting the data in the dynamic C# class. The C# computing device is also configured to use the at least one dynamic C# class to return one response from the multiple JSON classes.

In one example, a web service runs on three different web methods (e.g., classes): GetSimpleClassByID, GetSimpleClassByName, and GetSimpleClassByDescription. These three methods may return different data associated with a user. For example, the user identifier (ID), membership data associated with the user, merchant name associated with the user. Therefore, each of these three different web methods includes one or more types of data making each web method a complex subset of data. The type of data returned when calling each of these methods is the same. For instance, a call to GetSimpleClassByID will return a SimpleClass object, a call to GetSimpleClassByName will also return a SimpleClass object, and a call to GetSimpleClassByDescription will also return a SimpleClass object. The C# computing device uses the at least one dynamic C# class to return one set of data from the three different web methods instead, thus, avoiding the need to predefine three C# classes to consume the returned data. By simplifying the number of predefined C# classes needed to handle the returns from different web methods of the same data type, the C# computing device facilitates maintenance and updates of both JSON classes and C# classes.

The methods and systems described herein may be implemented using computer programming or engineering techniques including computer software, firmware, hardware or any combination or subset thereof, wherein the technical effect is achieved by performing at least one of: (a) deserializing a JSON class to C# at runtime; identifying an attribute name in the C# class (b) dynamically generating at least dynamic C# class at runtime based on data associated with the identified attribute name; (c) including in the least one dynamic C# class a target class and method returning embedded values within the dynamic C# class in the type required; (d) defining the at least C# dynamic class to receive responses from different web methods. The technical effects described herein apply to the technical field of dynamically serializing C# classes at runtime. The systems and methods described herein provide the technical advantage of avoiding creating multiple C# classes (e.g., wrapper classes) to receive responses from different web methods during runtime of data objects.

The following detailed description illustrates embodiments of the disclosure by way of example and not by way of limitation. It is contemplated that the disclosure has general application to networks in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example C Sharp (C#) system 100 for dynamically serializing C# classes during runtime of data objects, in which a variety of computing devices are communicatively coupled to each other via a plurality of network connections. These network connections may be Internet, LAN/WAN, or other connections capable of transmitting data across computing devices. In the example embodiment, C# system 100 includes C# computing device 150. In one embodiment, C# computing device 150 is a component of server system 112. Server system 112 may be a server, a network of multiple computer devices, a virtual computing device, or the like. C# computing device 150 may be in communication with network 102, such as the Internet. More specifically, network 102 may be in communication with framework 104, such as a Windows® Communication Foundation (WCF) Web Service, for building service-oriented applications. In the example embodiment, framework 102 is configured to receive JavaScript Object Notation (JSON) strings, serialize the JSON strings into one or more JSON classes, and transmit the one or more JSON classes to JSON deserializer component (not shown. In the example embodiment, framework 102 is part of C# computing device 150, is in direct communication with JSON deserializer component, and directly transmits the one or more JSON classes to JSON deserializer component. In other embodiments, framework 104 transmits the one or more JSON classes to JSON deserializer component via a network, such as network 102. The one or more JSON classes may be transmitted using different communication interface methods.

In some embodiments, C# computing device 150 is configured to receive one or more JSON strings through the frontend interface, such as a web interface, a command line tool, or an application. In some embodiments, JSON strings are received by a processor of C# computing device 150. C# computing device 150 may be communicatively coupled to an input adaptor located on network 104. C# computing device 150 and input adaptor of network 102 are interconnected via a network (e.g., the Internet) through many interfaces, such as a local area network (LAN) or a wide area network (WAN), dial-in-connections, cable modems, special high-speed Integrated Services Digital Network (ISDN) lines, and Reliable Data Transfer (RDT) networks.

In some embodiments, C# computing device 150 may generate multiple JSON classes including the same data objects, but different web service calls (e.g., method calls). In the example embodiment, C# computing device 150 is configured to deserialize the one or more JSON classes and serialize the one or more JSON classes to one or more C# class at runtime of data objects. C# computing device 150 is further configured to dynamically generate one or more C# classes (also referred to as dynamic C# class) at runtime of data objects to consume wrapped JSON Web Service (JSON-WS) responses without requiring defining a C# wrapper class in advance. C# computing device 150 generates the dynamic C# class by interrogating the C# class and identifying the attribute name included in the C# class and data objects associated with the attribute name. Once the data objects is identified, C# computing device 150 uses the identified data objects to generate the dynamic C# class. The data objects (e.g., instance variables) that the dynamic C# class returns only include the object and the data desired to be returned (e.g., "object.name"). The attribute name is removed from the data object simplifying the syntax of the returned data object. C# computing device 150 is further configured to transmit to requestor 108, in response to a request from requestor 108, the dynamic C# class including the data objects. Requestor 108 may be an application program interface (API) or any other type of requestor that requests the data objects.

Figure 2:
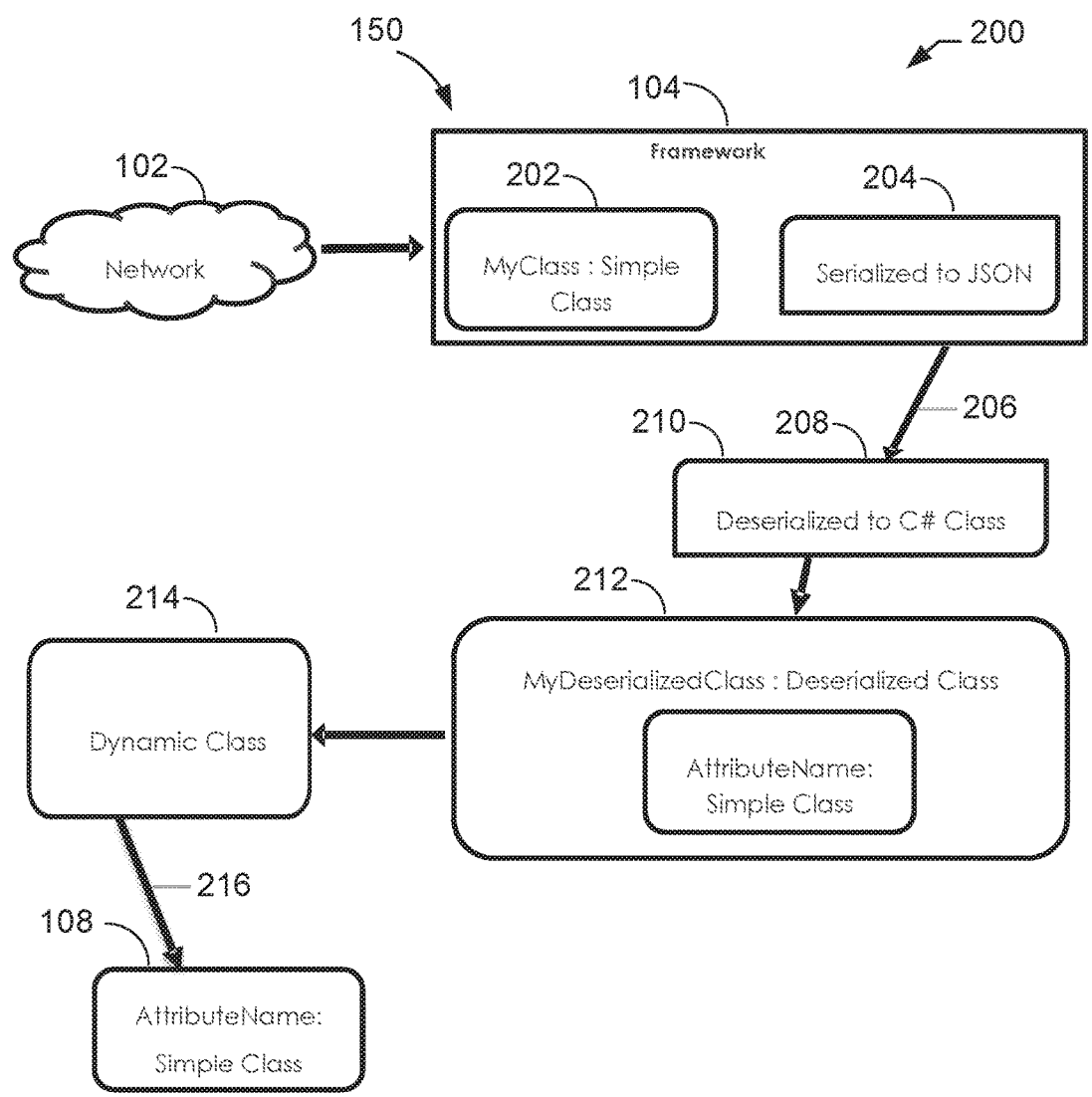

FIG. 2 illustrates an example process flow 200 for dynamically serializing C Sharp (C#) classes during runtime of data objects. Process flow 200 is performed using one or more systems, such as C# system 100 (shown in FIG. 1). In the example embodiment, process 200 includes network 102, framework 104, C# computing device 150, and requestor 108. In other embodiments, process flow 200 may be performed by fewer, or alternative subsystems, including those described elsewhere herein. For example, C# system 100 may include a plurality of frameworks 102, a plurality of networks 104, a plurality of C# devices 150, and/or a plurality of requestors 108.

In the example embodiment, framework 104 is configured to receive JSON strings from network 102. Framework 104 is also configured to build 202 service-oriented applications including one or more attributes, and serialize 204 JSON strings into one or more JSON classes. Once the one or more JSON classes are serialized, framework 102 transmits 206 the one or more JSON classes to JSON deserializer component. JSON deserializer component receives the one or more JSON classes and deserializes 208 each JSON class. C# serializer component generates 210 one or more C# classes by using the deserialized JSON classes. C# computing device 150 identifies 212 each attribute name and data associated with the attribute names included in the generated C# classes by interrogating each C# class. Once the data and attribute names are identified, C# computing device generates 214, at runtime of data objects, a dynamic C# class that concatenates data objects having the same attribute names in at least one string. In response to a request from requestor 108, C# computing device 150 transmits 216 the dynamic C# class to requestor 108.

Process flow 200 enables to return, on a simplified string, data objects having the same attribute names and different web service calls. Whereas, some known systems are not able to generate simplified strings including data objects having the same attribute names and different web service calls. As way of an example, below are illustrations of the data objects that some known systems return and the data objects that process flow 200 returns.

Known Systems Example Code

```
// The code
public class DynamicClassTest
{
  public static SimpleClass test( )
  {
    SimpleClass @return;
    // assume that jsonString was returned from a call to a web method named
    GetSimpleClassById which returns a SimpleClass object
    string jsonString = "{'GetSimpleClassByIdResult':{'Name':'John Smith'}}";
    // first we must deserialze to the ReturnFromGetSimpleClassById class
    ReturnFromGetSimpleClassById @Return1 =
    JsonConvert.DeserializeObject<ReturnFromGetSimpleClassById>(jsonString);
    // and then we can access the simple class inside
    @return = @Return1.GetSimpleClassByIdResult;
    // assume that jsonString was returned from a call to a web method named
    GetSimpleClassByDescription which returns a SimpleClass object
    jsonString = "{'GetSimpleClassByDescriptionResult':{'Name':'John Smith'}}";
    // first we must deserialze to the ReturnFromGetSimpleClassById class
    ReturnFromGetSimpleClassByDescription @Return2 =
```

```
JsonConvert.DeserializeObject<ReturnFromGetSimpleClassByDescription>
(jsonString);
// and then we can access the simple class inside
@return = @Return2.GetSimpleClassByDescriptionResult;
// assume that jsonString was returned from a call to a web method named
GetSimpleClassByName which returns a SimpleClass object
```

Process 200 Example Code

```
// The simple class
public class SimpleClass
{
   public string Name { get; set; }
}
public static SimpleClass test2( )
{
   SimpleClass @return1;
   SimpleClass @return2;
   SimpleClass @return3;
   string jsonString1 = "{'GetSimpleClassByIdResult':{'Name':'John Smith'}}";
   string jsonString2 = "{'GetSimpleClassByDescriptionResult':{'Name':'John Smith'}}";
   string jsonString3 = "{'GetSimpleClassByNameResult':{'Name':John Smith'}}";
   // Now we just use the DynamicClass to get the inner object directly.
   @return1 = (SimpleClass)DynamicClassFactory.ConvertJSONtoClass
   (jsonString1, typeof(SimpleClass));
   @return2 = (SimpleClass)DynamicClassFactory.ConvertJSONtoClass
   (jsonString2, typeof(SimpleClass));
   @return3 = (SimpleClass)DynamicClassFactory.ConvertJSONtoClass
   (jsonString3, typeof(SimpleClass));
   return @return3;
}
```

As it is illustrated above, process flow 200 eliminates the need for C# wrapper classes to be created and maintained by returning the data objects that are embedded in the JSON class, and thus, simplifying and reducing time for maintenance and updates of C# classes and JSON classes.

Figure 3:
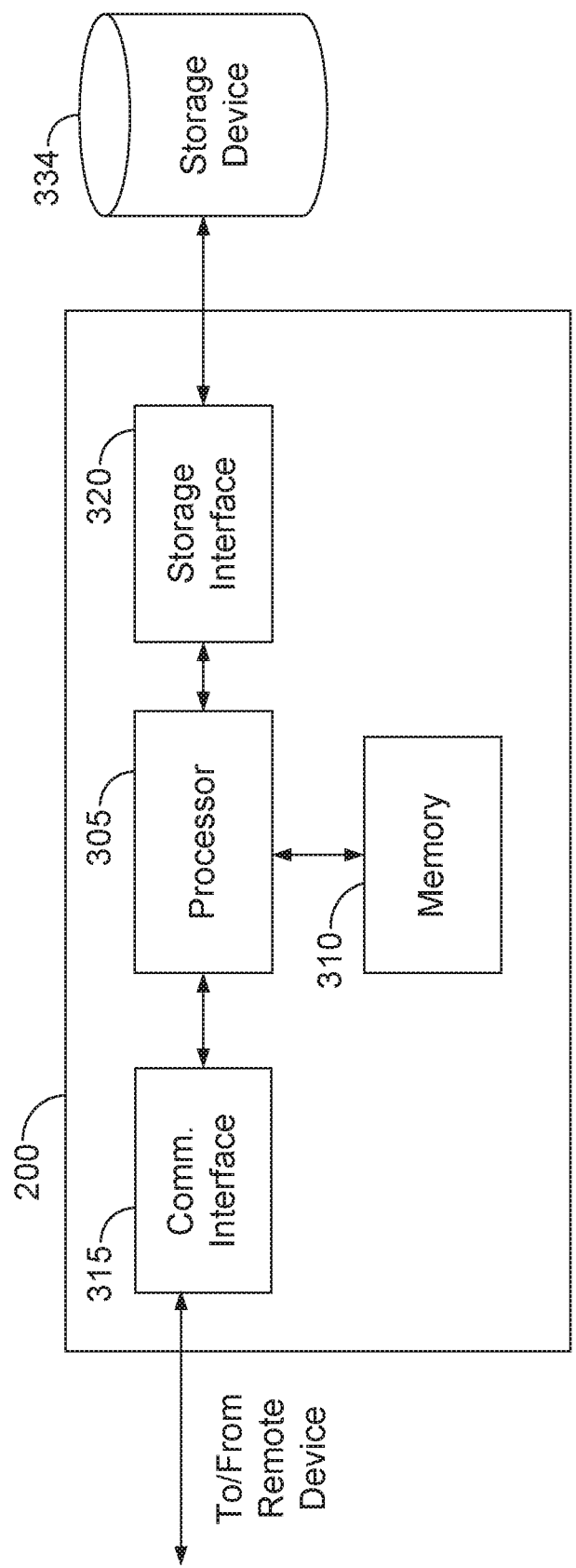

FIG. 3 illustrates an example configuration of a server system 200 such as the server system 112 (shown in FIG. 1) that includes C# computing device 150 (shown in FIG. 1). Server system 300 may include C# computing device 150. In some embodiments, server system 300 is similar to server system 112.

Server system 300 includes a processor 305 for executing instructions. Instructions may be stored in a memory 310, for example. Processor 305 may include one or more processing units (e.g., in a multi-core configuration) for executing instructions. The instructions may be executed within a variety of different operating systems on the server system 300, such as UNIX, LINUX, Microsoft Windows®, etc. More specifically, the instructions may cause various data manipulations on data stored in storage device 334 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 300 is capable of communicating with a remote device, such as a user system or another server system 300. For example, communication interface 315 may receive communications from framework 102 via network 104, such as the Internet, as illustrated in FIG. 1.

Processor 305 may also be operatively coupled to a storage device 334. Storage device 334 is any computer-operated hardware suitable for storing and/or retrieving data. In some embodiments, storage device 334 is integrated in server system 300. In other embodiments, storage device 334 is external to server system 300. For example, server system 300 may include one or more hard disk drives as storage device 334. In other embodiments, storage device 334 is external to server system 300 and may be accessed by a plurality of server systems 300. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Memory 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
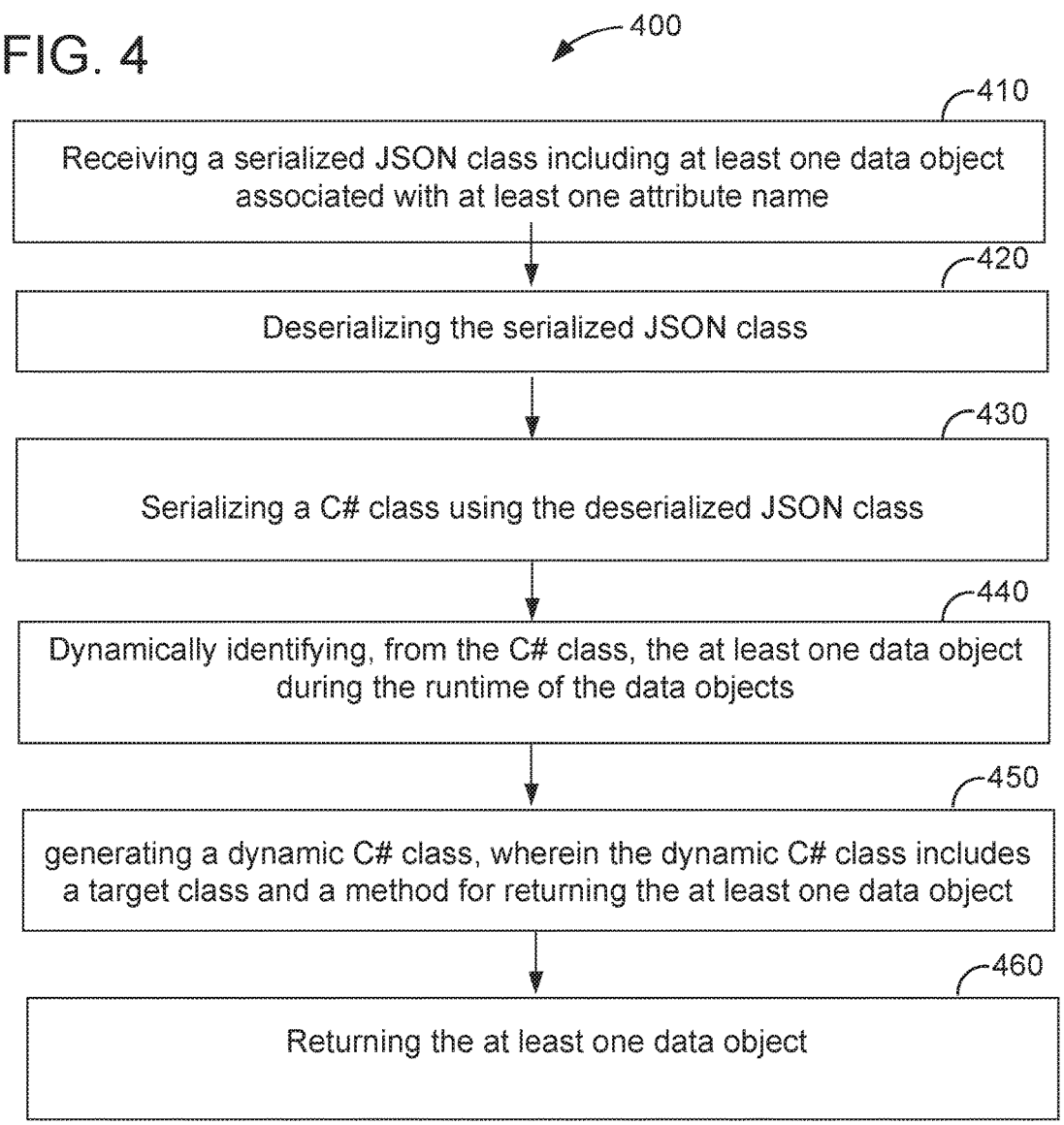

FIG. 4 is an example flow diagram illustrating a method flow 400 by which C# computing device 150 (shown in FIG. 1) dynamically serializes C# classes. Method 400 includes receiving 410 a serialized JSON class including at least one data object associated with at least one attribute name, deserializing 420 the serialized JSON class, and serializing 430 a C# class using the deserialized JSON class. Method 400 also includes dynamically identifying 440, from the C# class, the at least one data object during the runtime of the data objects. Method 400 further includes generating 450 a dynamic C# class, wherein the dynamic C# class includes a target class and a method for returning the at least one data object, and returning 460 the at least one data object.

Figure 5:
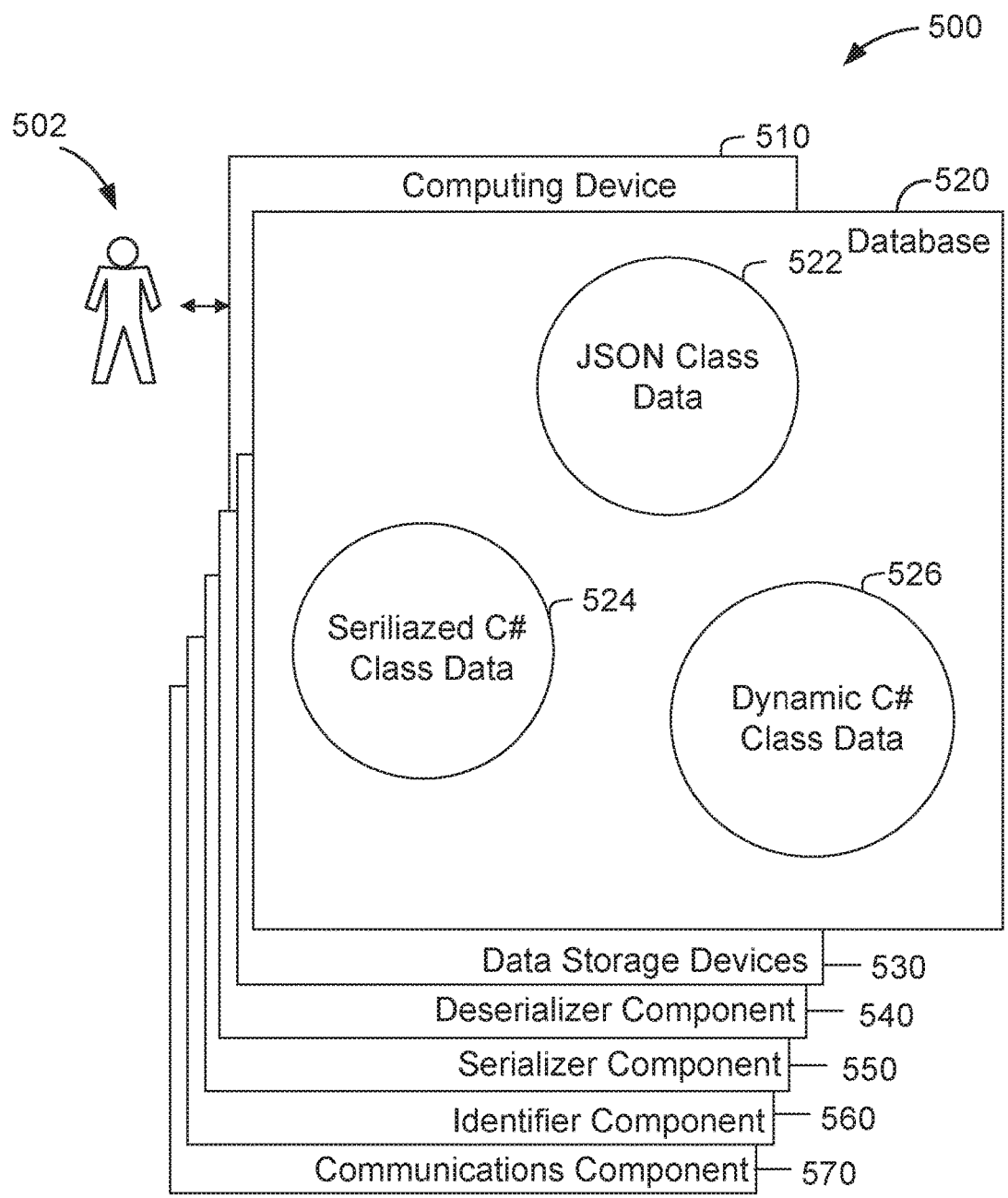

FIG. 5 shows an example configuration of a database 500 within a computing device, along with other related computing components, that may be used to dynamically serialize C# classes during runtime of data objects. In some embodiments, computing device 510 is similar to server system 212 (shown in FIG. 2). User 502 (such as a user operating server system 212) may access computing device 510 in order to retrieve data for JSON serialization and/or deserialization as well as C# serialization and/or deserialization, such as logs, events, and metrics.

In some embodiments, database 520. In the example embodiment, database 520 includes serialized JSON class data 522, serialized C# class data 524, and dynamic C# class data 526. Serialized JSON class data 522 may include an attribute name, a target class name, computer device data where the serialized JSON class was received from (e.g., IP address data, MAC address data, network identifier, framework identifier), serialized JSON class time stamp (e.g., time the serialized JSON class was received and/or time the serialized JSON class was deserialized), and other data, including historical data associated with the serialized JSON class.

Serialized C# class data 524 may include an attribute name, a target class name, serialized C# class time stamp (e.g., time a C# class was serialized), and other data, including historical data associated with the serialized C# class. Dynamic C# class data 526 may include an attribute name, a target class name, computer device data of the requestor of the attribute name (e.g., IP address data, MAC address data, network identifier, framework identifier), requestor data (e.g., API identifier), dynamic C# class time stamp (e.g., time a request was received, time a response was transmitted, time the attribute name was identified), and other data, including historical data associated with the dynamic C# class.

Computing device 510 also includes data storage devices 530. Computing device 510 also includes a JSON deserializer component 540 for deserializing JSON classes. JSON deserializer component 540 may perform, for example, receiving 410 (shown in FIG. 4) a serialized JSON class and deserializing 420 (shown in FIG. 4) the serialized JSON class. Computing device 510 also includes C# serializer component 550 that may perform, for example, serializing 430 (shown in FIG. 4) a C# class using the deserialized JSON class, and generating 450 (shown in FIG. 4) a dynamic C# class, wherein the dynamic C# class includes a target class and a method for returning at least one data object. Computing device 510 further includes a C# identifier component 560. C# identifier component 560 may perform, for example, dynamically identifying 430 (shown in FIG. 4), from the C# class, the at least one data object during the runtime of the data objects. Computing device 510 also includes communications component 570 which is used to communicate with other computing devices using predefined network protocols such as TCP/IP (Transmission Control Protocol/Internet Protocol) over the Internet.

The dynamic C# class or any other class may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present disclosure is not TCP/IP specific or Internet-specific. The present disclosure may be embodied using various protocols over various types of computer networks.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they

What is claimed is:

1. AC Sharp (C#) system comprising one or more C Sharp (C#) computing devices for dynamically serialize C Sharp (C#) classes during runtime of data objects, the one or more C# computing devices comprising at least one processor and a memory, the one or more C# computing devices configured to:
   receive a serialized JSON (JavaScript Object Notation) class including at least one data object associated with at least one attribute name;
   deserialize the serialized JBON class;
   serialize a C# class using the deserialized JBON class;
   dynamically identify, from the C# class, the at least one data object during the runtime of the data objects;
   generate a dynamic C# class, wherein the dynamic C# class includes a target class and a method for returning the at least one data object; and
   return the at least one data object.

2. The system of claim 1 further configured to transmit the dynamic C# class to a requestor.

3. The system of claim 2, wherein the requestor is an application program interface.

4. The system of claim 2 further configured receive a request from the requestor.

5. The system of claim 1 further configured to receive the serialized JSON class from one or more different types of web methods.

6. The system of claim 1 further configured to serialize a plurality of JSON strings to the JSON class.

7. A computer-implemented method for dynamically serializing C Sharp (C#) classes during runtime of data objects, the method implemented using one or more C Sharp (C#) computing devices coupled to a memory device, the method comprising:
   receiving a serialized JSON class including at least one data object associated with at least one attribute name;
   deserializing the serialized JSON class;
   serializing a C# class using the deserialized JSON class;
   dynamically identifying, from the C# class, the at least one data object during the runtime of the data objects;
   generating a dynamic C# class, wherein the dynamic C# class includes a target class and a method for returning the at least one data object; and
   returning the at least one data object.

8. The method of claim 7 further comprising transmitting the dynamic C# class to a requestor.

9. The method of claim 8, wherein the requestor is an application program interface.

10. The method of claim 8 further comprising receiving a request from the requestor.

11. The method of claim 7 further comprising receiving the serialized JSON class from one or more different types of web methods.

12. The method of claim 7 further comprising serializing a plurality of JSON strings to the JSON class.

13. A non-transitory computer-readable medium that includes computer-executable instructions for dynamically serializing Sharp (C#) classes during runtime of data objects, wherein when executed by one or more security C Sharp (C#) computing devices comprising at least one processor in communication with at least one memory device, the computer-executable instructions cause the one or more C# computing devices to:
   receive a serialized JSON class including at least one data object associated with at least one attribute name;
   deserialize the serialized JSON class;
   serialize a C# class using the deserialized JSON class;
   dynamically identify, from the C# class, the at least one data object during the runtime of the data objects;
   generate a dynamic C# class, wherein the dynamic C# class includes a target class and a method for returning the at least one data object; and
   return the at least one data object.

14. The computer-readable medium of claim 13 wherein the one or more C# computing devices are further configured to transmit the result to a requestor.

15. The computer-readable medium of claim 14, wherein the requestor is an application program interface.

16. The computer-readable medium of claim 14 wherein the one or more C# computing devices are further configured receive a request from the requestor.

17. The computer-readable medium of claim 13 wherein the one or more C# computing devices are further configured to receive the serialized JSON class from one or more different types of web methods.

18. The computer-readable medium of claim 13 wherein the one or more C# computing devices are further configured to serialize a plurality of JSON strings to the JSON class.

* * * * *

UNITED STATES PATENT AND TRADEMARK OFFICE
CERTIFICATE OF CORRECTION

| | | |
|---|---|---|
| PATENT NO. | : 10,467,321 B2 | Page 1 of 1 |
| APPLICATION NO. | : 15/698231 | |
| DATED | : November 5, 2019 | |
| INVENTOR(S) | : Mark Webster | |

It is certified that error appears in the above-identified patent and that said Letters Patent is hereby corrected as shown below:

In the Claims

In Claim 1, Column 11, Line 4, delete "AC Sharp (C#) system" and insert therefor -- A C Sharp (C#) system --.
In Claim 1, Column 11, Line 13, delete "JBON class" and insert therefor -- JSON class --.
In Claim 1, Column 11, Line 14, delete "JBON class" and insert therefor -- JSON class --.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*